Jan. 20, 1970 W. A. J. GHYSELINCK 3,490,512
MACHINE FOR MOUNTING TIRES ON THE RIM OF A VEHICLE WHEEL
Filed Feb. 8, 1967 5 Sheets-Sheet 2
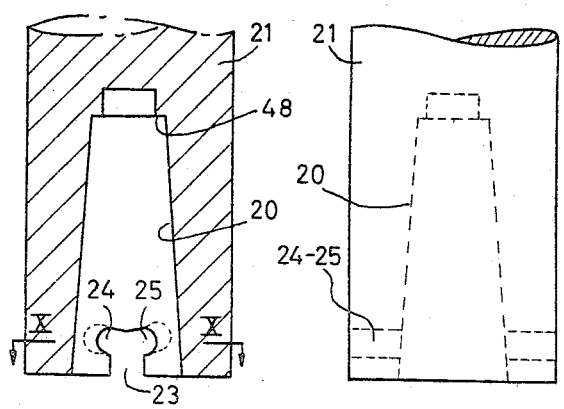
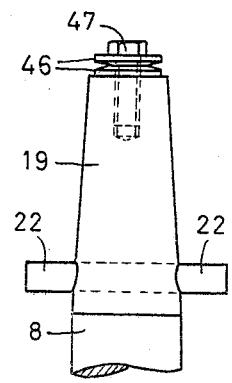
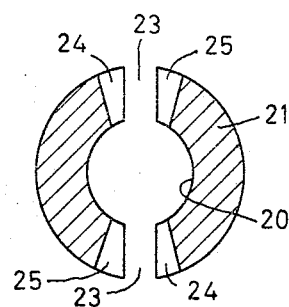
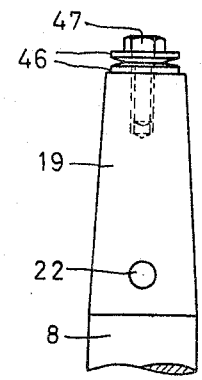
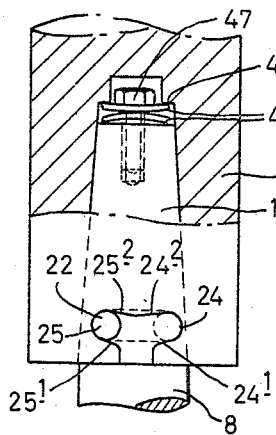
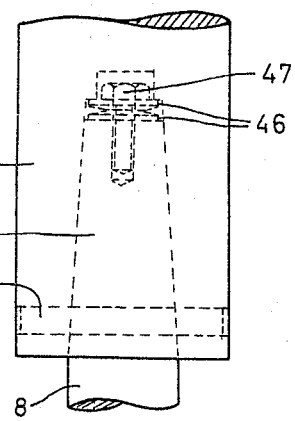

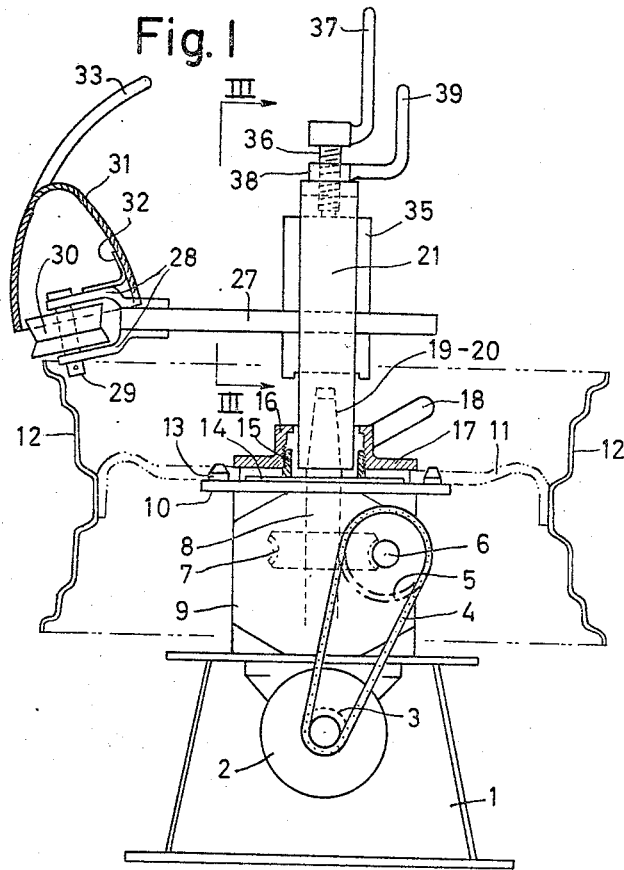

Jan. 20, 1970 W. A. J. GHYSELINCK 3,490,512
MACHINE FOR MOUNTING TIRES ON THE RIM OF A VEHICLE WHEEL
Filed Feb. 8, 1967 5 Sheets-Sheet 5

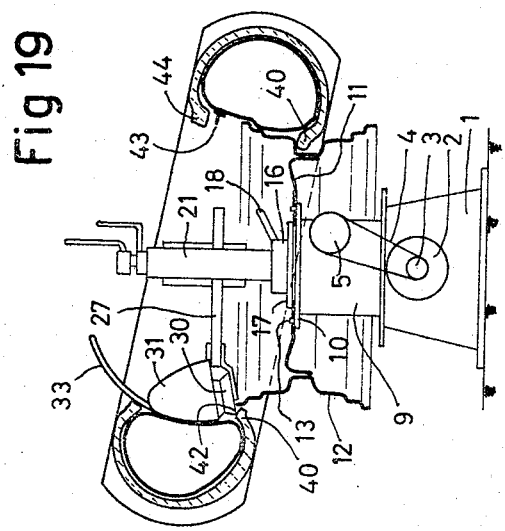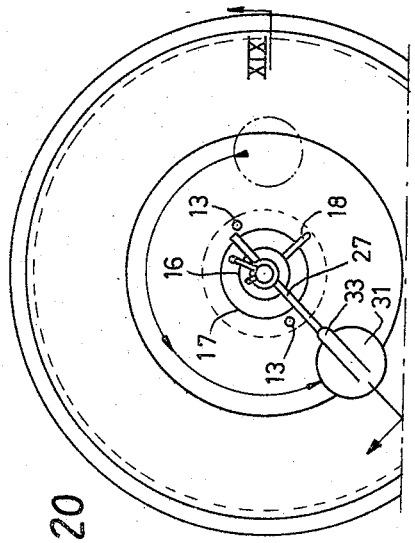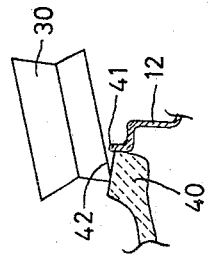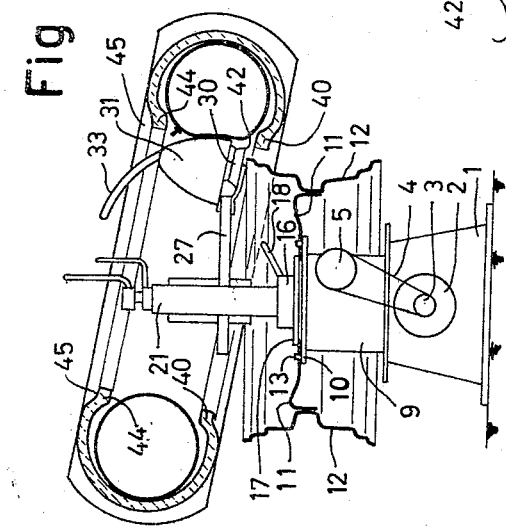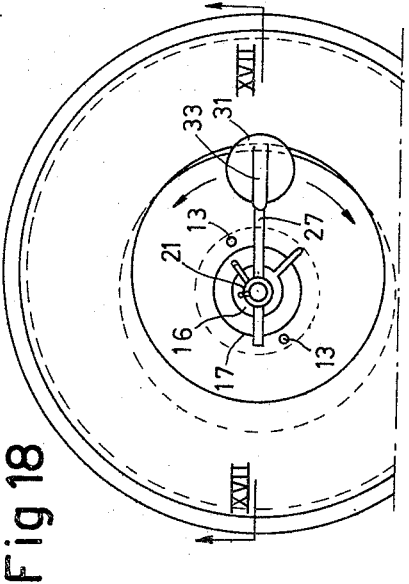

Jan. 20, 1970   W. A. J. GHYSELINCK   3,490,512
MACHINE FOR MOUNTING TIRES ON THE RIM OF A VEHICLE WHEEL
Filed Feb. 8, 1967   5 Sheets-Sheet 5
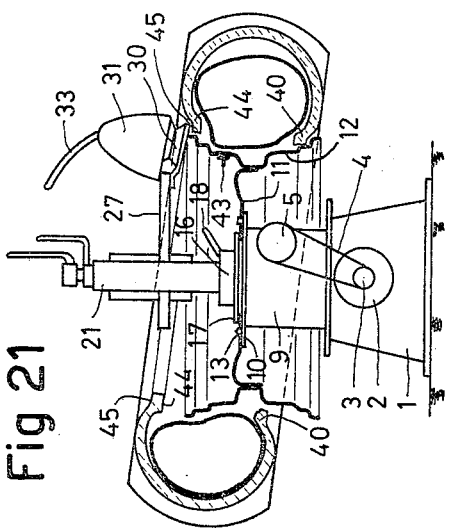
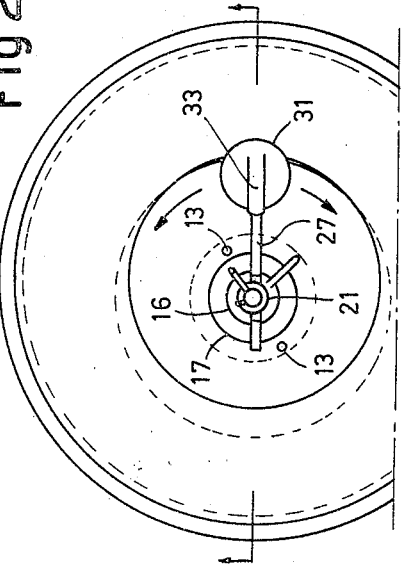
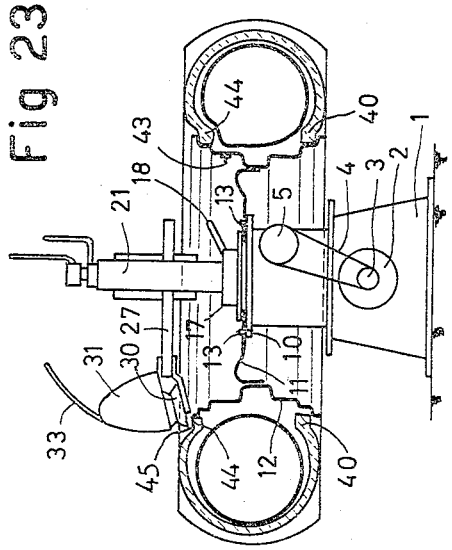
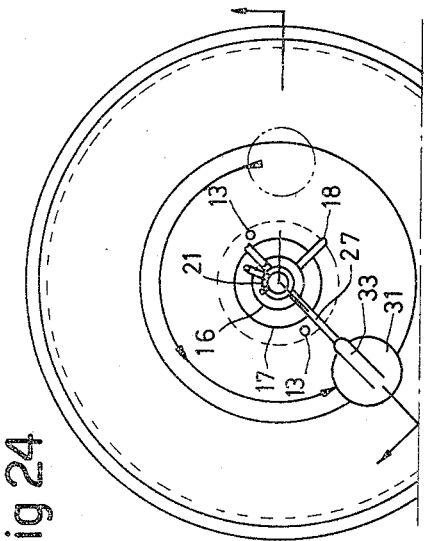

United States Patent Office 3,490,512
Patented Jan. 20, 1970

---

3,490,512
MACHINE FOR MOUNTING TIRES ON THE RIM OF A VEHICLE WHEEL
Willy Adrien Josef Ghyselinck, Torhoutsesteenweg 27, Zedelgem, Belgium
Filed Feb. 8, 1967, Ser. No. 614,642
Claims priority, application Belgium, Feb. 9, 1966, 676,244
Int. Cl. B60c 25/06
U.S. Cl. 157—1.24                    9 Claims

ABSTRACT OF THE DISCLOSURE

For mounting a tire on the rim of a vehicle wheel there is provided a machine which comprises a base surmounted by a casing having a supporting plate for receiving a web of a wheel rim onto which a tire is to be mounted, there being a vertical drive shaft in the casing terminating at its upper end in a conical portion which is detachably engageable in a demountable member by means of a bayonet-type connection in which there are provided ramps to insure a wedge-type locking between the conical portion and the demountable member, the latter carrying an arm which supports a wheel adapted to act on the bead of the tire to force it on the rim when the drive shaft is rotated.

---

My invention relates to a machine for mounting tires on the rim of a vehicle wheel, the machine comprising a base surmounted by a casing having a plate against which there bears the web of the rim on which the tire with its inner tire is to be mounted.

It is an object of the invention to obviate some disadvantages of the prior art, more particularly those in which mounting has to be performed by hand and requires considerable muscular strength the invention enabling the mounting to be performed rapidly without considerable labor costs.

The invention is particularly applicable to very large tires such as those for agricultural machines, for instance, combine harvesters.

To this end, the machine to which the invention relates is characterized in that a vertical drive shaft terminates in a conical portion which extends hardly, if at all, beyond the support plate and on which there is engaged via a conical hollow a demountable member forming a continuation of the drive shaft and acting as a support, usually in regulatable positions, for an arm disposed substantially horizontally and bearing at its end a small wheel whose purpose is to act on the bead of the tire to force it to move on the rim when the drive shaft is rotated.

The invention will be better understood from the following description of a non-limitative exemplary embodiment thereof, with reference to the drawings, wherein;

FIG. 1 is an elevation view, partly in section of the complete machine.

FIG. 2 is a plan view of the machine,

Figure 13:
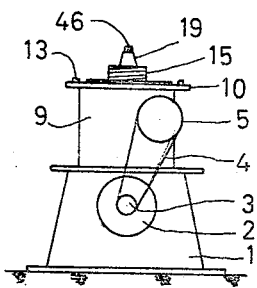
Figure 14:
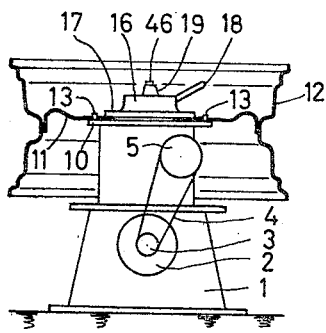
Figure 15:
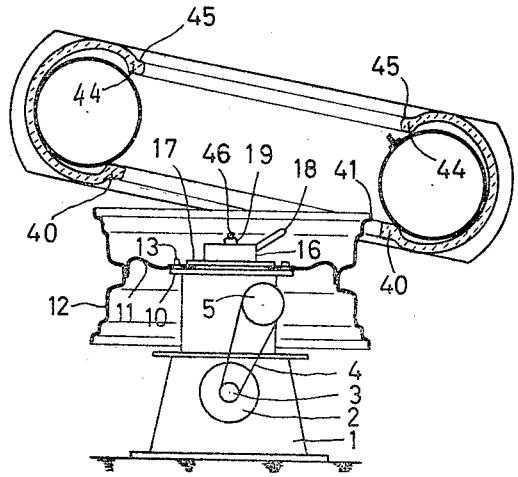
Figure 16:
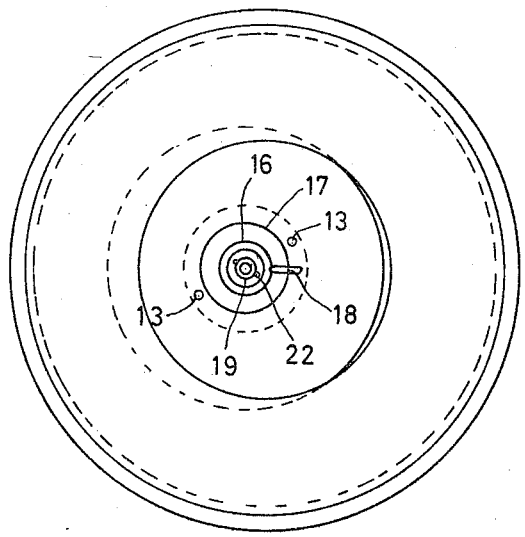

FIG. 3 is an elevation view partly in section showing a detachable support for a wheel carrying arm of the machine, FIG. 4 is an elevation view of one of the members of the detachable support, FIG. 5 is a sectional view taken along line V—V in FIG. 4, FIG. 6 is an elevation view of a portion of a conical member which is adapted to receive the detachable support, FIG. 7 is an elevation view of the conical member of FIG. 6 taken at right angles thereto, FIG. 8 is a longitudinal sectional view through the lower portion of the detachable support, FIG. 9 is an elevation view of the portion of the detachable support of FIG. 8 taken at right angles thereto, FIG. 10 is a sectional view taken along line X—X in FIG. 8, FIG. 11 is an elevation view, partly broken away, showing the engagement of the detachable support on the conical member, FIG. 12 is an elevation view of the arrangement of FIG. 11 taken at right angles thereto, FIG. 13 is an elevation view of the lower portion of the machine, FIG. 14 is an elevation view showing the portion of FIG. 13 with a rim of a wheel mounted thereon, FIG. 15 is an elevation view showing the tire placed on the rim, FIG. 16 is a plan view thereof, and FIGS. 17–24 show the various stages in the mounting of the tire on the rim.

A machine comprises a base 1 supporting a motor 2 whose shaft bears a toothed pinion 3 over which there passes a chain 4 driving a toothed wheel 5 keyed to a shaft 6 of an endless screw, with which there meshes a helical worm wheel 7 attached to avertical shaft 8 disposed in a casing 9. Disposed on the casing 9 is a plate 10 against which there bears, during the use of the machine, web 11 of a rim 12 on which the tire with its air chamber is to be mounted. The rim 12 is retained by pins 13.

Unitary with the plate 10 is a centring base 14 for bearing an externally threaded bush 15 concentric with the vertical shaft 8. Co-operating with the bush 15 is a nut 16 which is screwed onto the bush 15 and bears at the bottom a plate 17 bearing against the web 11 of the rim 12. The nut 16 has a handle 18 for rotating the nut 16 and its plate 17.

The shaft 8 terminates at the top in a conical portion 19 which can be introduced into a conical bore 20 with which a continuation 21 forming a detachable member is formed (FIGS. 6–8); this member has at its base, in diametrically opposed positions, double bayonet-type devices 24–25 with apertures 23 for the introduction of tenons or pins 22.

The shaft 21 is formed with a slot 26 (FIG. 4) through which there extends an arm 27 which is disposed horizontally and bears at its end a fork whose arms 28 are inclined outwards and downwards, a pin 29 perpendicular with the arms 28 extending therethrough and bearing a small wheel 30 therebetween. The pin 29 has selected directions so as to form with the shaft 8-21 an angle whose apex is at the bottom.

The small wheel 30 is formed by two cones superimposed by their minor bases, and is covered by an inclined bell-shaped member 31 attached to the fork 28 via a bent internal flat member 32 and having a curved arm 33, whose function will be explained hereinafter. The arm 27 can occupy in the slot 26 a position which can be regulated and varies, in dependence on the type of rim, by the arm 27 sliding in the slot 26, in which the arm 27 can be regulated and fixed by chocks 34–35.

The result is an active assembly which can be oriented in various planes with accuracy and has the required rigidly for transmitting the considerable forces required for large tires.

The top face of the continuation 21 can be acted upon by a pressure screw 36 having a handle 37 for acting on the chocks 34–35 to lock the arm 27 in the selected position. The screw 36 can be wedged by a locking nut 38 having a handle 39.

The operational phases for mounting a tire are as follows:

(1) On the plate 10 there is placed a rim 11–12, the web 11 resting onto plate 10 (FIG. 14); the nut 16–17 is screwed on the threaded portion 15 and is rotated by the handle 18 so that the plate 17 immobilizes the web 11 of the rim 12 against the plate 10. The two pins 13 have been introduced into two bolt holes in the web 11.

(2) The tire, together with its weakly inflated inner tube is placed at a slight inclination on the machine (FIG. 15) so that over a portion of its periphery the inside of the bead 40 (wire) situated at the bottom is at a lower level than the edge 41 of the rim 12 (FIGS. 15 and 16).

(3) The continuation 21 having the arm 27 and the small wheel 30 with the bell-shaped member 31 and the curved arm 33 are then put in position (FIG. 17); as they are being put in position, the conical bore 20 in the continuation 21 (FIGS. 8–9) engages over the conical portion 19 of the shaft 8 (FIGS. 6–7): the continuation 21 is slightly rotated by hand so that the tenons 22 engage in a notch 24 or 25 in the bayonet-type device (FIGS. 11–12). A slight ramp $24^1$–$25^1$ provided on the bayonet-type device ensures, via wedging of the pins 22 in the notches, the locking of the cone 9 in the cone 21, and therefore a rigid connection between the continuation 21 to the shaft 8. The small wheel 30 is therefore automatically brought into the position shown in FIG. 17.

(4) The valve 43 (FIG. 21) is introduced into the hole with which the rim is formed for this purpose.

(5) The motor 2 is then started, and the assembly 8–21–27–30–31–33 is rotated: during the rotation, the bottom edge 42 of the small wheel 30 bears against the inner face of the bead 40 situated at the tire bottom, and forces the bead to move on the rim 12 (FIGS. 19A–20). During the course of rotation, the bell shaped member 31 contacts the inner tube in the tire, as shown in FIG. 17. The tire then occupies a substantially horizontal position, and the bead at the bottom of the tire is engaged on the rim.

(6) Pressure is then exerted by hand downwardly over a portion of the tire so as to bring the bead 44 situated at the top slightly below the edge 41 of the rim 12.

(7) The machine is then rotated again and the edge 42 of the small wheel bears against the outer face 45 of the bead situated at the top and forces the bead to take its place on the rim (FIGS. 23–24). The arm 33 rides on bead 44 of the tire and the member 31 guides the inner tube on the rim as shown in FIG. 19.

The tire is therefore completely placed on the rim, and it only remains to unlock the assembly 21–27–30–31 from the shaft 8 and remove the assembly. The members 16–17–18 are disengaged to allow the wheel to be removed together with its tire, and lastly the tire can be inflated.

To facilitate the unlocking of the two cones 19–20 when the continuation 21 is removed, a slight ramp $24^2$–$25^2$ is provided on the bayonet-type device of the continuation 21. To this end, it is enough to give the arm 27 a slight knock in the direction of rotation of the shaft 8 to make the pin 22 force the cone 20 of the continuation 21 to become detached from the cone 19 of the shaft 8.

Moreover, the disengagement of the continuation 21 is facilitated by a spring device 46 (Belleville washers or the like) attached via a screw 47 to the top end of the cone 19 which normally exerts a pressure on the end 48 of the bore 20 and tends to repel the continuation 21 in relation to the shaft 8

Clearly, the machine according to the invention is superior to the prior art machines, since the former is perfectly adapted to present-day conditions and requires only completely mechanical operations which can be carried out very rapidly.

Moreover, according to the invention a rigid assembly is used to transmit the forces required for large tires.

The device according to the invention not only satifies this requirement, but also allows adaptation to the substantially variable conditions caused by different sizes of tires, although the active element (21) can still be readily and rapidly dismantled. The rigidity is immediately restored after the replacement of the various members with all the necessary accuracy.

What I claim is:

1. A machine for mounting a tire on the rim of a vehicle wheel, said machine comprising a base, a casing on said base having a supporting plate for receiving a web of a wheel rim onto which a tire is to be mounted, a vertical drive shaft in said casing including an upper, terminal, conical portion, a demountable member on said drive shaft forming a continuation thereof, said demountable member having a conical bore adapted to receive said conical portion, an arm supported by said demountable member in a substantially horizonal position, a wheel on said arm adapted to act on the bead of the tire to force it on the rim when the drive shaft is rotated, bayonet engagement devices in diametrically opposed positions on said demountable member and conical portion for coupling said demountable member and conical portion in driving engagement, said bayonet engagement devices including pins on one of the demountabe member and conical portion, the other having notches for receiving the pin and apertures for the introduction of said pins thereinto, said notches being provided with slight ramps to insure wedging of the pins in the notches and positive locking of said conical portion in the conical bore of the demountable member and a rigid connection of the demountable member with the drive shaft.

2. A machine as claimed in claim 1 wherein said pins are on said conical portion and the notches and apertures are in said demountable member.

3. A machine as claimed in claim 1, wherein said demountable member is provided with an axially extending slot receiving said arm and means in said slot for retaining said arm in selected positions in said slot.

4. A machine as claimed in claim 3, wherein said means for retaining said arm in said slot comprises chocks disposed in said slot on either side of said arm.

5. A machine as claimed in claim 4, wherein said means for retaining said arm in said slot further comprises a pressure screw threadably engaged in said demountable member for clamping the chocks and arm together.

6. A machine as claimed in claim 1, wherein said notches are provided with second ramps opposite the first ramps to facilitate disengagement of the pins from the slots 7. A machine as claimed in claim 1 comprising spring means between said conical portion and said demountable member axially urging the same apart to facilitate disengagement therebetween.

8. A machine as claimed in claim 1, wherein said arm has an outer end with a fork thereat constituted by flanges extending outwardly and downwardly, a pin supported in said flanges and extending perpendicularly thereto, said wheel being supported on said pin.

9. A machine as claimed in claim 8, wherein said wheel includes two conical portions having a common smaller base, a folded flat member secured to said fork and having a portion extending thereabove and an inclined bell member attached to said portion for acting on a tube which is placed in said tire.

References Cited

UNITED STATES PATENTS

| | | | |
|---|---|---|---|
| 1,498,299 | 6/1924 | Rollins | 157—1.24 |
| 2,497,644 | 2/1950 | Watkins | 157—1.24 |
| 2,948,314 | 8/1960 | Bishman | 157—1.24 X |
| 3,038,528 | 6/1962 | Cunningham | 157—1.24 |

THERON E. CONDON, Primary Examiner

R. L. SPRUILL, Assistant Examiner